United States Patent
Kim (10) Patent No.: US 9,180,915 B2
(45) Date of Patent: Nov. 10, 2015

(54) DOUBLE SUPPORT STRUCTURE OF A FRONT BODY STRUCTURE OF A VEHICLE

(71) Applicant: Hyundai Motor Company, Seoul (KR)

(72) Inventor: Hyun Sik Kim, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/480,249

(22) Filed: Sep. 8, 2014

(65) Prior Publication Data

US 2015/0291219 A1    Oct. 15, 2015

(30) Foreign Application Priority Data

Apr. 11, 2014 (KR) .......................... 10-2014-0043821

(51) Int. Cl.
*B62D 25/08*       (2006.01)

(52) U.S. Cl.
CPC .................................... *B62D 25/082* (2013.01)

(58) Field of Classification Search
CPC .............................. B62D 25/08; B62D 25/082
USPC ................ 296/187.1, 187.09, 203.02, 193.09
See application file for complete search history.

(56) References Cited

U.S. PATENT DOCUMENTS

| | | | |
|---|---|---|---|
| 7,926,847 B2 * | 4/2011 | Auer et al. ..................... 280/784 |
| 8,807,632 B2 * | 8/2014 | Ramoutar et al. ........ 296/187.09 |
| 8,991,903 B1 * | 3/2015 | Alavandi et al. ......... 296/187.09 |
| 2008/0023954 A1 * | 1/2008 | Eichberger et al. ........... 280/784 |
| 2012/0104804 A1 * | 5/2012 | Yoshida ................... 296/203.03 |
| 2014/0091585 A1 * | 4/2014 | Ramoutar et al. ............ 293/133 |
| 2014/0091595 A1 * | 4/2014 | Ramoutar et al. ....... 296/187.09 |
| 2014/0291053 A1 * | 10/2014 | Nagasawa et al. ............ 180/271 |
| 2015/0021936 A1 * | 1/2015 | Nusier et al. .................. 293/114 |
| 2015/0102635 A1 * | 4/2015 | Barbat et al. ............... 296/187.1 |

* cited by examiner

*Primary Examiner* — Jason S Morrow
(74) *Attorney, Agent, or Firm* — Morgan, Lewis & Bockius LLP (57) ABSTRACT

A support structure of a front body structure may include a first supporting member having both ends in a length direction thereof, the both ends being fixedly coupled respectively to a rear face of the front body structure in the length direction of the vehicle and any one of both side surfaces of the front side member in the width direction of the vehicle, and configured to support the small overlap crash energy firstly, and a second supporting member having both end portions, one end portion being rotatably coupled to the first supporting member and the other end portion being detachably coupled to the first supporting member such that in case the fixedly coupled portions of the first supporting member are deformed or damaged, the second supporting member is configured to rotate on the one end portion.

10 Claims, 5 Drawing Sheets

DOUBLE SUPPORT STRUCTURE OF A FRONT BODY STRUCTURE OF A VEHICLE

CROSS-REFERENCE TO RELATED APPLICATION

The present application claims priority of Korean Patent Application Number 10-2014-0043821 filed on Apr. 11, 2014, the entire contents of which are incorporated herein for all purposes by this reference.

BACKGROUND OF INVENTION

1. Field of Invention

The present invention relates to a front body structure, and more particularly, to a double support structure of the front body structure.

2. Description of Related Art

In general, a front body structure is a member mounted at a front portion of a front side member forming a frame of a front of a vehicle body in a length direction of the vehicle in order to prepare for a small overlap crash.

A front body structure is fixedly mounted at a left or right side of front end of a front side member mainly by welding. The front body structure may further include a supporting member by which the front body structure is supported and fixedly mounted at the front side member such that the shape of the front body structure with the supporting member from a top view is generally triangular.

Generally a front body structure includes a face extended in a width direction of a vehicle such that the front body structure can deliver crash energy to the front side member.

The front body structure transmits to the front side member or absorbs crash energy and plays a role of inducing a transverse behavior of a vehicle by maintaining a condition of a constant inclination angle between a barrier and the vehicle body when a small overlap crash with no direct contact between the front side member and the barrier, namely, a colliding body happens.

However, in case of an actual small overlap crash with a prior front body structure, a front side member is easily broken so that the crash energy is not transmitted enough, the transverse behavior of a vehicle is not maintained, and thereby degree of damage to the vehicle and a passenger's injuries become large.

Figure 1:
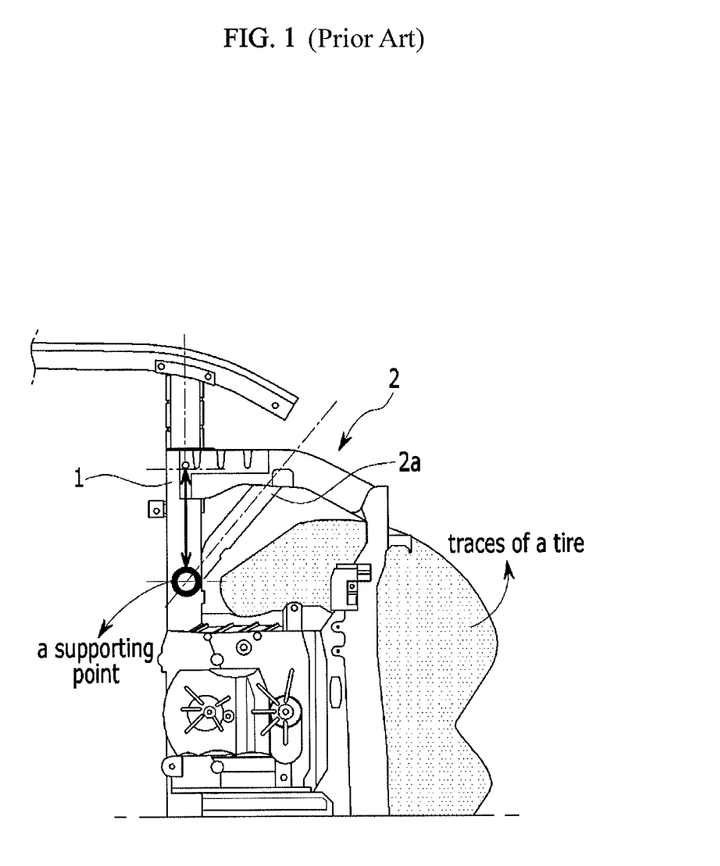
FIG. 1 is a plan view of a vehicle body fitted with a prior front body structure.

FIG. 1 is a plan view of a vehicle body fitted with a prior front body structure.

A front body structure 2 in FIG. 1 is mounted at right side portion of a front of a vehicle and is extended in a width direction of the vehicle in a right front portion of a front side member 1, and is supported by a supporting member 2a.

In case of a small overlap crash of a right front portion of a vehicle with no direct contact between the front side member 1 and a barrier, the front body structure 2 supports crash energy and simultaneously transmits the crash energy to the front side member 1 through the supporting member 2a.

Fitted with a prior support structure of the front body structure 2, the front side member 1 is easily broken because a structured connection between a supporting member 2a and front side member 1 is fulfilled at only one supporting point and a distance (an arrow is shown in FIG. 1) between the supporting point and a mounting position of the front body structure 2 and a length of the supporting member 2a are short.

Referring to traces of a tire shown in FIG. 1, it is understood that in case a length of the supporting member 2a becomes long, a problem of the tire and the supporting member 2a coming into contact can be generated.

The traces of a tire and the vehicle body must maintain a proper gap.

It is generally the case that the problem of the front side member 1 being easily broken is hard to be solved because it is also hard to connect an additional support structure for the same reason above.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing such a support structure of a front body structure of a vehicle that a transverse behavior of the vehicle is maintained in a small overlap crash situation and crashworthiness of the vehicle is improved.

In various aspects of the present invention, a support structure of a front body structure which is mounted at a front portion of a front side member forming a frame of a front of a vehicle body in a length direction of the vehicle and may have a face extended in a width direction of the vehicle and configured for the front body structure to transmit crash energy to the front side member when a small overlap crash happen may be provided.

In an aspect of the present invention, a support structure of a front body structure which is mounted at a front portion of a front side member forming a frame of a front of a vehicle body in a length direction of the vehicle and may have a face extended in a width direction of the vehicle and configured for the front body structure to transmit crash energy to the front side member when a small overlap crash happens, may include a first supporting member having both ends in a length direction thereof, the both ends being fixedly coupled respectively to a rear face of the front body structure in the length direction of the vehicle and any one of both side surfaces of the front side member in the width direction of the vehicle, and configured to support the small overlap crash energy firstly, and a second supporting member having both end portions, a first end portion being rotatably coupled to a first end portion of the first supporting member and a second end portion being detachably coupled to a second end portion of the first supporting member such that in case fixedly coupled portions of the first supporting member are deformed or damaged, the second supporting member is configured to rotate on the first end portion thereof.

The first supporting member may have a hexahedral shape provided with a target inner space therein or may have a cross section perpendicular to the length direction thereof including a straight line and at least two side lines, one ends of the two side lines being connected respectively to both ends of the straight line and an opposite side of the straight line being open, and the second supporting member may have a cross section perpendicular to the length direction thereof including a straight line and at least two side lines, one ends of the two side lines being connected respectively to both ends of the straight line and an opposite side of the straight line being open in order for the second supporting member to surround three faces of the first supporting member in an outside direction of the vehicle.

The second end portion of the first supporting member is fixedly coupled to an outer surface of the front side member in the width direction of the vehicle.

The support structure may further include a hinge pin, wherein the first end portion of the second supporting member is rotatable on the hinge pin, and wherein the hinge pin is fitted in a height direction of the vehicle through a first hinge hole formed in the height direction of the vehicle at the first end portion of the first supporting member and a second hinge hole formed in the height direction of the vehicle at the first end portion of the second supporting member corresponding to a position of the first hinge hole to couple the first supporting member and the second supporting member.

The first supporting member may further include flanges formed at the both ends thereof and is fixedly coupled by the flanges being welded respectively to the front body structure and the front side member.

The first supporting member may further include at least one fitting protrusion, the second supporting member may further include at least one fitting hole, and the first supporting member and the second supporting member are detachably coupled by inserting the at least one fitting protrusion into the corresponding fitting hole.

The first supporting member may further include at least one fitting protrusion formed at the second end portion thereof, the second supporting member may further include at least one fitting hole at the second end portion thereof, and the first supporting member and the second supporting member are detachably coupled by inserting the at least one fitting protrusion into the corresponding fitting hole.

The first supporting member and the second supporting member are detachably coupled by structural adhesive.

A second fixing member is formed or mounted at a rear end of the second supporting member in the length direction of the vehicle, and the second supporting member stops rotating and becomes coupled to the front side member by the second fixing member such that the second supporting member secondly supports the crash energy.

The support structure may further include a convex or concave guide rail formed longitudinally on any one of the both side surfaces of the front side member in the width direction of the vehicle, and the second fixing member is a plate type member contacting a surface of the front side member and may have a concave or convex guide groove formed thereon such that a rectilinear motion of the second fixing member is caused in a length direction of the front side member by the guide rail.

The support structure may further include a stopping member formed or mounted at a predetermined position of the front side member and configured to stop the motion of the second fixing member.

The stopping member fixedly couples the second supporting member and the front side member secondly by forming a space where the second fixing member is coupled and received.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

In addition, unless explicitly described to the contrary, the word "comprise" and variations such as "comprises" or "comprising" will be understood to imply the inclusion of stated elements but not the exclusion of any other elements and the name of a component doesn't set limits to the function of the component concerned.

Figure 2:
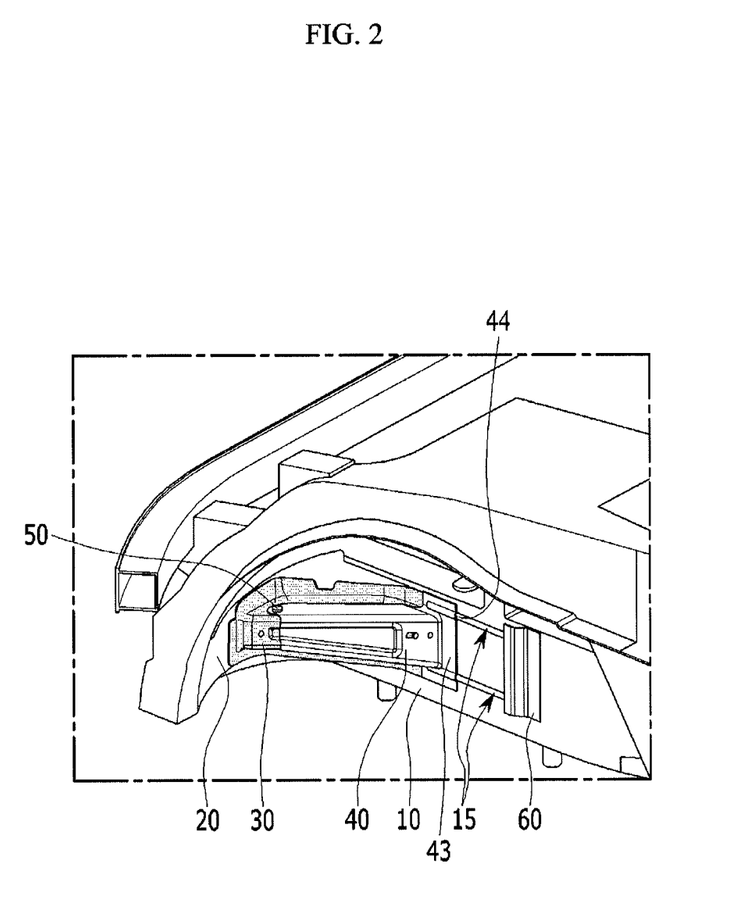
FIG. 2 is a perspective view of a vehicle body fitted with an exemplary support structure of a front body structure according to an exemplary embodiment of the present invention.

FIG. 2 is a perspective view of a vehicle body fitted with an exemplary support structure of a front body structure according to an exemplary embodiment of the present invention.

An exemplary support structure of a front body structure 20 according to an exemplary embodiment of the present invention may include a first supporting member 30 and a second supporting member 40.

The first supporting member 30 has both ends in a length direction thereof, the both ends being fixedly coupled respectively to a rear face of the front body structure 20 in a length direction of a vehicle and any one of both side surfaces of the front side member 10 in a width direction of the vehicle, and supports the small overlap crash energy firstly.

The second supporting member 40 has both end portions, one end portion being rotatably coupled to the first supporting member 30 and the other end portion being detachably coupled to the first supporting member 30 such that in case the fixedly coupled portions of the first supporting member 30 are deformed or damaged, the second supporting member 40 is configured to rotate on the one end portion.

Figure 5:
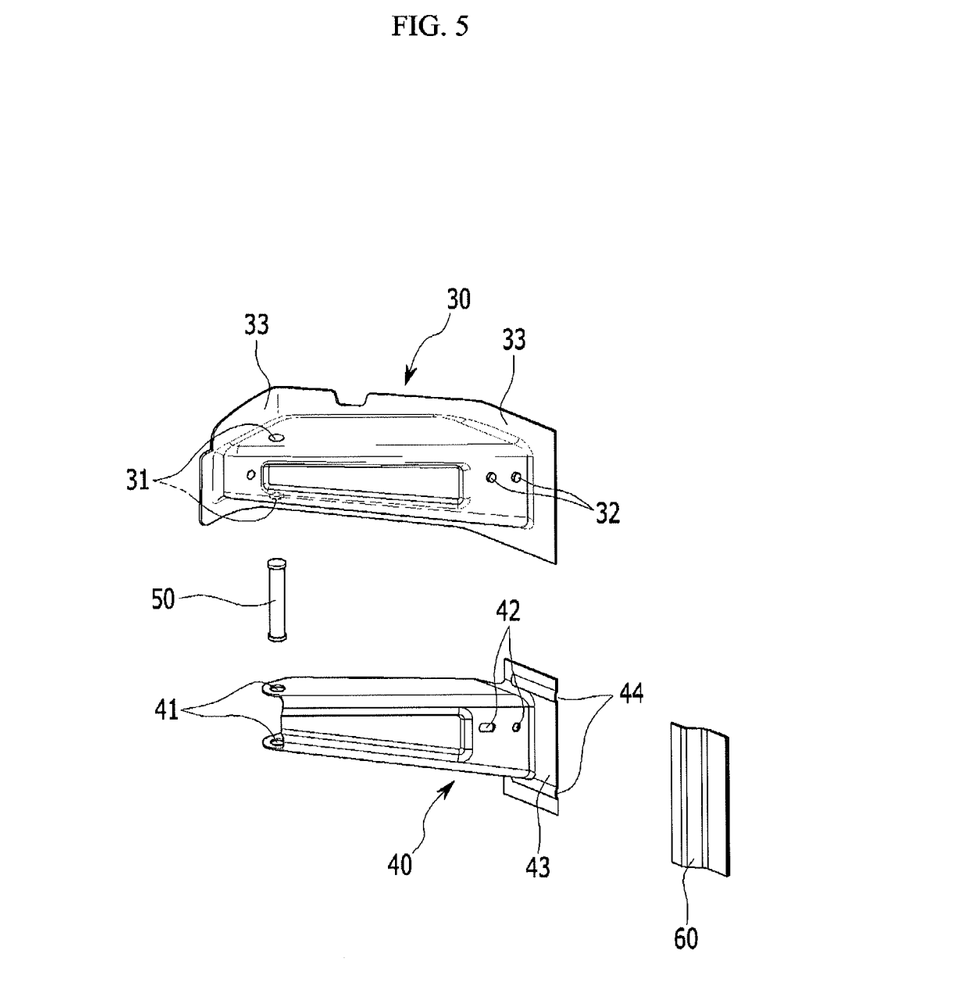
FIG. 5 is an exploded perspective view of constituent elements of an exemplary support structure of a front body structure according to an exemplary embodiment of the present invention.

In this case, the detachable coupling may be achieved by applying structural adhesive to contact surfaces of the first supporting member 30 and the second supporting member 40 or using at least one fitting protrusion 32 and at least one fitting hole 42 shown in FIG. 5.

A shape of the first supporting member 30 may include such a hexahedral shape that a target inner space is formed.

That is, a cross section perpendicular to a length direction of the first supporting member 30 may be a tetragonal. The first supporting member 30 may further include flanges 33 (Refer to FIG. 5) formed at the both ends thereof such that the first supporting member 30 can be fixedly coupled to the front body structure 20 and the front side member 30 by the flanges 33 being welded respectively.

Unlike the case explained above, the first supporting member 30 may have a cross section perpendicular to the length direction thereof including a straight line and at least two side lines, one ends of the two side lines being connected respectively to both ends of the straight line and an opposite side of the straight line being open.

One end of the first supporting member 30 may be fixedly coupled to any one of both side surfaces of the front side member 10 in a width direction of the vehicle, but an outer surface in the width direction of the vehicle may be recommended in aspects of a characteristic of a small overlap crash and a structure of an engine room.

The second supporting member 40 may have such a shape that two end faces in a length direction of the second supporting member and a face in the inside direction of the vehicle are opened in order for the second supporting member to surround three faces of the first supporting member 30 in an outside direction of the vehicle.

In an exemplary embodiment of FIG. 2, the support structure of the front body structure 20 may further include a hinge pin 50 configured to become a rotation axis of the rotation of the second supporting member 40.

The hinge pin 50 may be fitted in a height direction of the vehicle through a first hinge hole 31 formed in the height direction of the vehicle at a front portion of the first supporting member 30 in the length direction of the vehicle and a second hinge hole 41 formed in the height direction of the vehicle at a front portion of the second supporting member 40 in the length direction of the vehicle corresponding to a position of the first hinge hole 31.

The first supporting member 30 and the second supporting member 40 are coupled by the hinge pin 50 such that the second supporting member 40 is rotatable.

The coupling can be achieved by a rivet for hinge coupling or any other various devices or methods as long as the second supporting member 40 is rotatable.

Referring to FIG. 2, an exemplary support structure of a front body structure 20 according to an exemplary embodiment of the present invention may further include a second fixing member 43 formed or mounted at a rear end of the second supporting member 40 in the length direction of the vehicle.

In case the fixedly coupled portions of the first supporting member 30 are deformed or damaged right after a small overlap crash and the second supporting member 40 rotates on the hinge pin 50, the second fixing member 43 plays a role of causing the second supporting member 40 to secondly support crash energy by stopping the rotation and engaging with a certain member of the front side member 10.

In an aspect, the second fixing member 43 may be a plate type member formed to be in contact with a surface of the front side member 10.

However, it is not limited to a plate type member according to an exemplary embodiment of the present invention.

In case the second fixing member 43 is a plate type member, the front side member 10 may have a convex or concave guide rail 15 formed longitudinally on any one of the both side surfaces thereof in a width direction of a vehicle.

In this case, a concave or convex guide groove 44 contacting correspondingly to the convex or concave guide rail 15 may be formed on the plate type second fixing member 43, and thereby the second fixing member 43 can move rectilinearly.

An exemplary support structure of a front body structure 20 according to an exemplary embodiment of the present invention may further include a stopping member 60.

The stopping member 60 is formed or mounted at a predetermined position of the front side member 10 in order to stop movements of the second fixing member 43.

The stopping member 60 may form a space receiving a second fixing member 43 and thereby couple the second supporting member 40 and the front side member 10 secondly.

Figure 3:
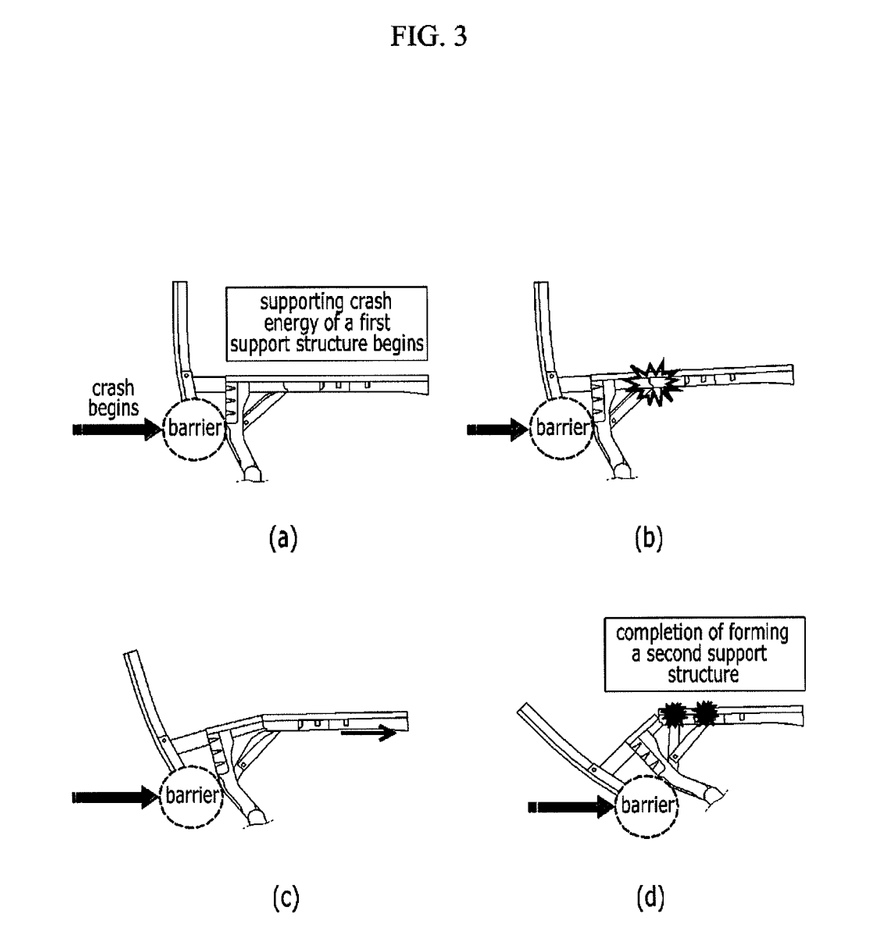
FIG. 3 is a drawing showing operational principles of an exemplary support structure of a front body structure according to an exemplary embodiment of the present invention.

FIG. 3 is a drawing showing operational principles of an exemplary support structure of a front body structure according to an exemplary embodiment of the present invention.

In FIG. 3(a), a moment of a first support structure being formed by a first supporting member 30 is shown.

This is a situation right after a small overlap crash.

FIG. 3(b) shows a situation in which a supporting point of a front side member 10, namely, a load concentration portion begins to be broken.

A second supporting member 40 begins to rotate on a hinge pin 50 on account of a separation of the detachable coupling formed by structural adhesive or a fitting device.

However, a portion (e.g., the second fixing member 43) of the second supporting member 40 contacting an outer surface of the front side member 10 in a width direction of a vehicle structurally begins to move rectilinearly.

FIG. 3(c) shows a situation in which the second supporting member 40 keeps opening out as deformation of the front side member 10 becomes larger.

FIG. 3(d) shows a situation in which the second supporting member 40 opens out to the maximum, the rotation thereof is stopped by a coupling portion (e.g., a stopping member 60 in FIG. 2), and thereby the second supporting member 40 forms a second support structure.

By the second support structure, the vehicle experiencing the small overlap crash becomes able to maintain a transverse behavior.

In case the front side member 10 is easily broken without the second support structure, the vehicle becomes not to be transversely pushed away, crash energy acts without being absorbed to a frame of the vehicle body, and thereby degree of damage to the vehicle and a passenger's injuries can become large.

Figure 4:
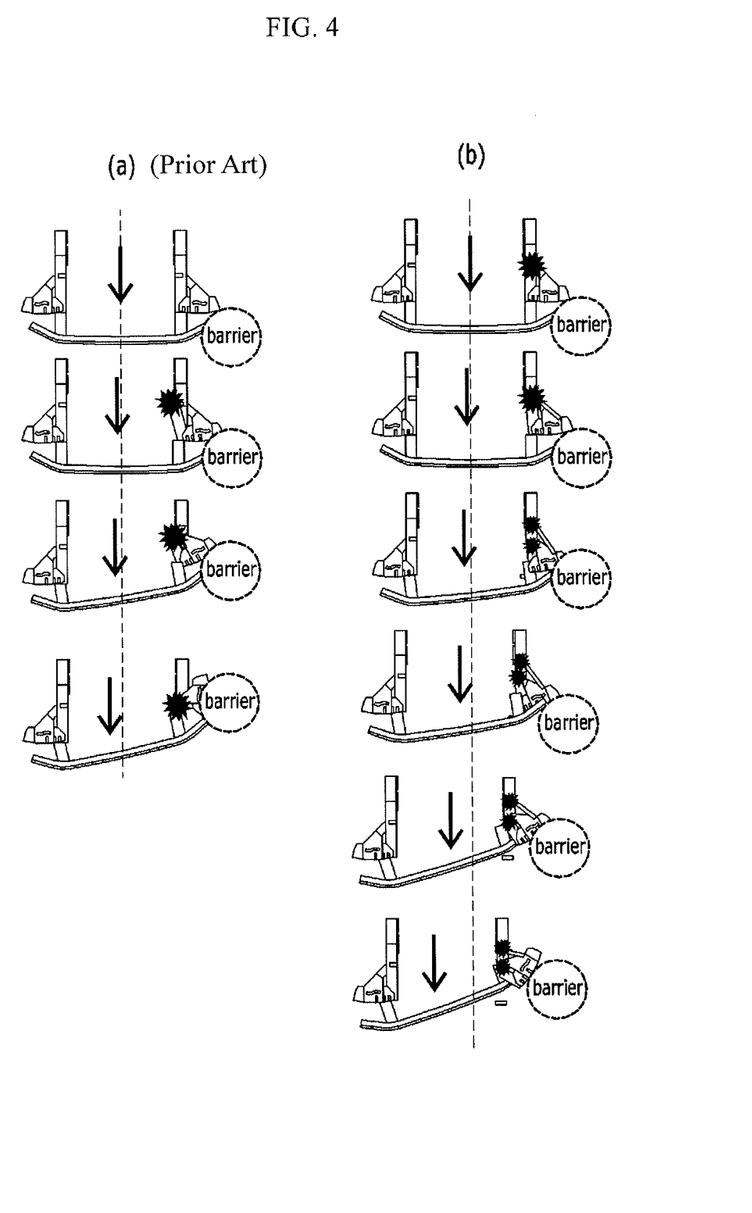
FIG. 4 is a drawing showing a principle of generation of a transverse behavior of a vehicle fitted with an exemplary support structure of a front body structure according to an exemplary embodiment of the present invention in relation to a prior art.

FIG. 4 is a drawing showing a principle of generation of a transverse behavior of a vehicle fitted with an exemplary support structure of a front body structure according to an exemplary embodiment of the present invention in relation to a prior art.

FIG. 4(a) shows how a vehicle fitted with a prior front body structure experiences processes of a small overlap crash.

Referring to FIG. 4(a), a proceeding direction of a vehicle is indicated as an arrow, crash energy is not effectively absorbed to the vehicle body on account of a breakage of a front side member, and thereby a transverse behavior is hardly generated. This is shown by the arrows being near to a dashed center line.

FIG. 4(b) shows how a vehicle fitted with an exemplary front body structure according to an exemplary embodiment of the present invention experiences processes of a small overlap crash.

Unlike the case of FIG. 4(a), it is understood that a second supporting member 40 opens out, a second support structure is formed, and thereby crash energy is adequately transmitted or absorbed to the front side member 10 and a transverse behavior is caused and maintained.

This is shown by the arrows gradually moving in the transverse direction from the dashed center line.

It is so because the crash energy is being adequately absorbed.

FIG. 5 is an exploded perspective view of constituent elements of an exemplary support structure of a front body structure according to an exemplary embodiment of the present invention.

Referring to FIG. 5, shapes and operational principles of a first supporting member 30, a second supporting member 40, a hinge pin 50, and a stopping member 60 can be easily understood.

A flange 33 may be formed at both ends of the first supporting member 30 in a length direction thereof.

In FIG. 5, the flange 33 comes into contact with a rear face of a front body structure 20 in a length direction of a vehicle and an outer surface of a front side member 10 in a width direction of the vehicle, is fixed by welding the both contact surfaces, and thereby causes the first supporting member 30 fixedly coupled to the front side member 10.

Two first hinge holes 31 and two fitting protrusions 32 are formed at the first supporting member 30 and two second hinge holes 41 and two fitting holes 42 are formed at the second supporting member 40 corresponding to the first hinge holes 31 and the fitting protrusions 32.

A plate type of a second fixing member 43 is formed at the second supporting member 40 and two concave guide grooves 44 are formed at the second fixing member 43 such that the second fixing member 43 in contact with two convex guide rails 15 formed on the outer surface of the front side member 10 of FIG. 2 in the width direction of the vehicle can move rectilinearly.

In case of a small overlap crash, the second supporting member 40 opened out by the rectilinear motion finally meets the stopping member 60 fixedly coupled at a predetermined position of the front side member 10 of FIG. 2, stops, and becomes to form the second support structure by being confined within a coupling space of the stopping member 60.

As explained in detail, in a small overlap crash situation the transverse behavior of the vehicle can be induced and maintained, thereby safety of passengers improves, and the crash energy transmitted to the vehicle body is effectively distributed or absorbed according to an exemplary embodiment of the present invention.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A support structure of a front body structure which is mounted at a front portion of a front side member forming a frame of a front of a vehicle body in a length direction of the vehicle and has a face extended in a width direction of the vehicle and configured for the front body structure to transmit crash energy to the front side member when a small overlap crash happens, the support structure comprising:

a first supporting member having both ends in a length direction thereof, the both ends being fixedly coupled respectively to a rear face of the front body structure in the length direction of the vehicle and any one of both side surfaces of the front side member in the width direction of the vehicle, and configured to support the small overlap crash energy firstly;

a second supporting member having both end portions, a first end portion being rotatably coupled to a first end portion of the first supporting member and a second end portion being detachably coupled to a second end portion of the first supporting member such that in case fixedly coupled portions of the first supporting member are deformed or damaged, the second supporting member is configured to rotate on the first end portion thereof, wherein a second fixing member is formed or mounted at a rear end of the second supporting member in the length direction of the vehicle, and wherein the second supporting member stops rotating and becomes coupled to the front side member by the second fixing member such that the second supporting member secondly supports the crash energy; and a convex or concave guide rail formed longitudinally on any one of the both side surfaces of the front side member in the width direction of the vehicle, wherein the second fixing member is a plate type member contacting a surface of the front side member and has a concave or convex guide groove formed thereon such that a rectilinear motion of the second fixing member is caused in a length direction of the front side member by the guide rail.

2. The support structure of claim 1, wherein the first supporting member has a hexahedral shape provided with a target inner space therein or has a cross section perpendicular to the length direction thereof comprising a straight line and at least two side lines, one ends of the two side lines being connected respectively to both ends of the straight line and an opposite side of the straight line being open, and wherein the second supporting member has a cross section perpendicular to the length direction thereof comprising a straight line and at least two side lines, one ends of the two side lines being connected respectively to both ends of the straight line and an opposite side of the straight line being open in order for the second supporting member to surround three faces of the first supporting member in an outside direction of the vehicle.

3. The support structure of claim 1, wherein the second end portion of the first supporting member is fixedly coupled to an outer surface of the front side member in the width direction of the vehicle.

4. The support structure of claim 1, further including a hinge pin,
wherein the first end portion of the second supporting member is rotatable on the hinge pin, and
wherein the hinge pin is fitted in a height direction of the vehicle through a first hinge hole formed in the height direction of the vehicle at the first end portion of the first supporting member and a second hinge hole formed in the height direction of the vehicle at the first end portion of the second supporting member corresponding to a position of the first hinge hole to couple the first supporting member and the second supporting member.

5. The support structure of claim 1, wherein the first supporting member further includes flanges formed at the both ends thereof and is fixedly coupled by the flanges being welded respectively to the front body structure and the front side member.

6. The support structure of claim 2, wherein the first supporting member further includes at least one fitting protrusion, the second supporting member further includes at least one fitting hole, and the first supporting member and the second supporting member are detachably coupled by inserting the at least one fitting protrusion into the corresponding fitting hole.

7. The support structure of claim 2, wherein the first supporting member further includes at least one fitting protrusion formed at the second end portion thereof, the second supporting member further includes at least one fitting hole at the second end portion thereof, and the first supporting member and the second supporting member are detachably coupled by inserting the at least one fitting protrusion into the corresponding fitting hole.

8. The support structure of claim 2, wherein the first supporting member and the second supporting member are detachably coupled by structural adhesive.

9. The support structure of claim 1, further including a stopping member formed or mounted at a predetermined position of the front side member and configured to stop the motion of the second fixing member.

10. The support structure of claim 9, wherein the stopping member fixedly couples the second supporting member and the front side member secondly by forming a space where the second fixing member is coupled and received.

* * * * *